United States Patent
Liu et al.

(10) Patent No.: US 12,209,056 B2
(45) Date of Patent: Jan. 28, 2025

(54) METHOD FOR PREPARING REFRACTORY FROM SECONDARY ALUMINUM DROSS

(71) Applicants: Chinalco Envir Prot & Energy Conserv Group Co., Ltd., Beijing (CN); IAP, Jiangxi Academy of Sciences, Jiangxi (CN)

(72) Inventors: Wanchao Liu, Beijing (CN); Rixin Wang, Jiangxi (CN); Yicheng Lian, Beijing (CN); Qiang Hu, Jiangxi (CN)

(73) Assignees: Chinalco Envir Prot & Energy Conserv Group Co., Ltd., Beijing (CN); IAP, Jiangxi Academy of Sciences, Jiangxi (CN)

( * ) Notice: Subject to any disclaimer, the term of this patent is extended or adjusted under 35 U.S.C. 154(b) by 0 days.

(21) Appl. No.: 18/681,147

(22) PCT Filed: Aug. 24, 2023

(86) PCT No.: PCT/CN2023/114645
§ 371 (c)(1),
(2) Date: Feb. 5, 2024

(87) PCT Pub. No.: WO2024/183244
PCT Pub. Date: Sep. 12, 2024

(65) Prior Publication Data
US 2024/0327292 A1    Oct. 3, 2024

(30) Foreign Application Priority Data
Mar. 6, 2023    (CN) .......................... 202310200698.0

(51) Int. Cl.
C04B 35/195    (2006.01)
C04B 35/443    (2006.01)
(Continued)

(52) U.S. Cl.
CPC .......... *C04B 35/195* (2013.01); *C04B 35/443* (2013.01); *C04B 35/62204* (2013.01);
(Continued)

(58) Field of Classification Search
CPC ................................................ C04B 35/62204
See application file for complete search history.

(56) References Cited

U.S. PATENT DOCUMENTS 5,132,246 A * 7/1992 Brisson .................. C04B 35/66
                                                                    75/10.21
5,424,260 A * 6/1995 Yerushalmi ......... C04B 35/1115
                                                                    501/153

FOREIGN PATENT DOCUMENTS

CN    107151148 A  *  9/2017
CN    107555447 A     1/2018
(Continued)

OTHER PUBLICATIONS

CN-108585826-B (Cui) Mar. 2, 2021 (English language translation). [online] [retrieved Oct. 24, 2024]. Retrieved from: Clarivate Analytics. (Year: 2021).*

(Continued)

*Primary Examiner* — Erin Snelting
(74) *Attorney, Agent, or Firm* — Kirk A. Wilson; Joseph T. Guy; Patent Filing Specialist Inc.

(57) ABSTRACT

A method for preparing a refractory from a secondary aluminum dross, the secondary aluminum dross including silica and alumina, and the refractory including a basic magnesium-aluminum refractory or an acidic magnesium-aluminum-silicon refractory; when the secondary aluminum dross includes less than 5% by mass of silica, the refractory is the basic magnesium-aluminum refractory, and the method includes: subjecting a secondary aluminum dross powder, an aluminum source, a magnesium source and a magnesia-alumina spinel seed crystal to first mixing, and (Continued)

subjecting a resulting first mixture to one-step sintering to obtain the basic magnesium-aluminum refractory; when the secondary aluminum dross includes not less than 5% by mass of silica, the refractory is the acidic magnesium-aluminum-silicon refractory, and the method includes: subjecting a secondary aluminum dross powder, a silicon source, and a magnesium source to second mixing, and subjecting a resulting second mixture to one-step sintering to obtain the acidic magnesium-aluminum-silicon refractory.

9 Claims, 7 Drawing Sheets

(51) Int. Cl.
    *C04B 35/622*     (2006.01)
    *C04B 35/626*     (2006.01)
    *C04B 35/64*     (2006.01)

(52) U.S. Cl.
    CPC .......... *C04B 35/6261* (2013.01); *C04B 35/64* (2013.01); *C04B 2235/3206* (2013.01); *C04B 2235/3218* (2013.01); *C04B 2235/3222* (2013.01); *C04B 2235/3409* (2013.01); *C04B 2235/3418* (2013.01); *C04B 2235/3445* (2013.01); *C04B 2235/445* (2013.01); *C04B 2235/5436* (2013.01); *C04B 2235/604* (2013.01); *C04B 2235/6562* (2013.01); *C04B 2235/6567* (2013.01); *C04B 2235/661* (2013.01); *C04B 2235/96* (2013.01)

(56) References Cited

FOREIGN PATENT DOCUMENTS

| CN | 111925204 A | * | 11/2020 | ........... C04B 35/443 |
| CN | 108585826 B | * | 3/2021 | ............ C01C 1/164 |
| CN | 113816759 A | | 12/2021 | |
| CN | 115947611 A | | 4/2023 | |
| JP | 2000263014 A | * | 9/2000 | |
| JP | 2006256910 A | | 9/2006 | |

OTHER PUBLICATIONS

CN-111925204-A (Feng) Nov. 13, 2020 (English language translation). [online] [retrieved Oct. 24, 2024]. Retrieved from: Clarivate Analytics. (Year: 2020).*
CN-107151148-A (Liu) Sep. 12, 2017 (English language translation). [online] [retrieved Oct. 24, 2024]. Retrieved from: Clarivate Analytics. (Year: 2017).*
JP-2000263014-A (Nishimura) Sep. 26, 2000 (English language translation). [online] [retrieved Oct. 24, 2024]. Retrieved from: Clarivate Analytics. (Year: 2000).*
Hamza et al. The Effect of Aluminum Dross on Fired Brick Products. Materials Science and Engineering, vol. 45, No. 1 (2020), pp. 106-114. DOI: 10.32974.mse.2020.010. (Year: 2020).*
Kepeng Huang et al.; Resource Utilization and High-Value Targeted Conversion for Secondary Aluminum Dross: A Review; JOM, vol. 75, No. 2, 2023;https://doi.org/10.1007/s11837-0.
Li Shuaet al; Study on Synthesis of MgAl2O4 from Pre-treated Aliminum Dross; http://ysyl.bgrimm.cn; China Academic Journal Electronic Publishing House; Sep. 15, 2020.
ISA/CN; ISR for PCT/CN2023/114645; Date mailed: Nov. 23, 2023.

* cited by examiner

METHOD FOR PREPARING REFRACTORY FROM SECONDARY ALUMINUM DROSS

CROSS REFERENCE TO RELATED APPLICATION

The present application is a national stage application of International Patent Application No. PCT/CN2023/114645, filed on Aug. 24, 2023, which claims priority to the Chinese Patent Application No. CN202310200698.0, filed with the China National Intellectual Property Administration (CNIPA) on Mar. 6, 2023, and entitled "METHOD FOR PREPARING REFRACTORY FROM SECONDARY ALUMINUM DROSS". The disclosure of the two applications is incorporated herein by reference in its entirety.

TECHNICAL FIELD

The present disclosure belongs to the technical field of hazardous solid waste treatment and resource utilization, and specifically relates to a method for preparing a refractory from a secondary aluminum dross.

BACKGROUND

Secondary aluminum dross is a hazardous waste generated from the recovery of metallic aluminum from primary aluminum dross, and is mainly characterized by low metallic aluminum content, complex impurity composition, high treatment cost, and difficulties in comprehensive utilization.

At the present stage, the disposal methods of the secondary aluminum dross generally comprise two steps: harmless disposal and resource utilization. Harmless disposal generally adopts the fire sintering process. On one hand, it is to remove the reactive materials and those with leaching toxicity, such as aluminum nitride, heavy metals, fluorine salts, and chlorine salts, so as to eliminate the hazardous waste characteristics of the secondary aluminum dross; on the other hand, the secondary aluminum dross is prepared into high alumina bauxite containing more than 70% of alumina, which is used as raw material for the next resource utilization step. For resource utilization, high alumina bauxite is used as a raw material, and other raw materials such as alumina and light-burnt magnesite are added thereto in a certain ratio, and pyrometallurgical processes, such as sintering is then performed to produce a refractory.

However, the above methods for preparing a refractory from a secondary aluminum dross by two-step sintering has the following two defects: (1) after the first sintering but before the second sintering, the temperature of the secondary aluminum dross needs to be reduced before matching with other raw materials, which results in a waste of energy, and the two sintering produces a large amount of soot, which increases the risk of secondary pollution in the process of waste disposal, and the cost of environmental protection; and (2) after the first sintering, almost all of the alumina component contained in the secondary aluminum dross is converted to a less active α-phase, with reduced reaction activity, which adversely affects the effect of the secondary sintering, thereby producing refractories with a high porosity.

SUMMARY

An object of the present disclosure is to provide a method for preparing a refractory from a secondary aluminum dross. Firstly, the method according to the present disclosure adopts one-step sintering and simultaneously realizes the harmless treatment and resource utilization of the secondary aluminum dross at low cost. Secondly, not only the direct one-step sintering for preparing the refractory simplifies the treatment steps of the secondary aluminum dross and realizes energy saving and emission reduction, but also the prepared refractory has the advantages of a low porosity, large grain size and high density. Thirdly, the direction of resource utilization of the secondary aluminum dross is optimized by analyzing the content of the main impurity silica in the secondary aluminum dross. Although the price of the basic magnesium-aluminum refractory is higher than that of the acidic magnesium-aluminum-silicon refractory, silica, as a common impurity in the secondary aluminum dross, belongs to acidic oxides and needs to be removed in the production of basic refractories. Therefore, when the content of silica is high, the cost of desilication will increase significantly, which will further affect the economy of the whole process in terms of resource utilization. In contrast, when used to produce acidic magnesium-aluminum-silicon refractories, silica could be present in the system, and the sintering temperature required to produce acidic magnesium-aluminum-silicon refractories is lower. Therefore, when the silica content in the secondary aluminum dross is relatively high, the preparation of the magnesium-aluminum-silicon refractories from secondary aluminum dross would bring out better economy.

In order to realize the above object, the present disclosure provides the following technical solutions:

The present disclosure provides a method for preparing a refractory from a secondary aluminum dross, wherein the secondary aluminum dross contains silica and alumina, and the refractory includes a basic magnesium-aluminum refractory and an acidic magnesium-aluminum-silicon refractory;

under the condition that the secondary aluminum dross includes less than 5% by mass of silica, the refractory prepared is the basic magnesium-aluminum refractory, and the method includes the following steps:

subjecting a secondary aluminum dross powder, an aluminum source, a magnesium source and a magnesia-alumina spinel seed crystal to first mixing to obtain a first mixture, and subjecting the first mixture to one-step sintering to obtain the basic magnesium-aluminum refractory, wherein the aluminum source is an aluminum-containing compound; and during the first mixing, provided that a mass of the secondary aluminum dross powder is converted to and expressed in terms of a mass of alumina, a mass of the aluminum source is converted to and expressed in terms of a mass of alumina, and a mass of the magnesium source is converted to and expressed in terms of a mass of magnesium oxide, the mass of the aluminum source accounts for 2%-10% of the mass of the secondary aluminum dross powder, the mass of the magnesium source accounts for 20%-30% of the mass of the secondary aluminum dross powder, and a mass of the magnesia-alumina spinel seed crystal accounts for 0.1%-0.5% of the mass of the secondary aluminum dross powder;

under the condition that the secondary aluminum dross includes greater than or equal to 5% by mass of silica, the refractory prepared is the acidic magnesium-aluminum-silicon refractory, and the method includes the following steps:

subjecting a secondary aluminum dross powder, a silicon source, and a magnesium source to second mixing to obtain a second mixture, and subjecting the second mixture to one-step sintering to obtain the acidic magnesium-aluminum-silicon refractory, wherein the silicon source is a silicon-containing substance excluding the secondary aluminum dross powder; and during the second mixing, provided that a mass of the secondary aluminum dross powder is converted to masses of alumina and silica, a mass of the magnesium source is converted to a mass of magnesium oxide, and a mass of the silicon source is converted to a mass of silica, a mass ratio of magnesium oxide, alumina and silica in the second mixture obtained from the second mixing is in a range of (14-15): (36-37): (48-50).

In some embodiments, the first mixture further includes a first mineralizer, the first mineralizer includes at least one selected from the group consisting of boric acid and aluminum fluoride, and a mass of the first mineralizer accounts for 1.5%-8% of the mass of the secondary aluminum dross powder, the mass of the secondary aluminum dross powder being converted to and expressed in terms of the mass of alumina; and the second mixture further includes a second mineralizer, the second mineralizer includes boric acid, and a mass of the second mineralizer accounts for less than or equal to 2% of a total mass of the secondary aluminum dross powder, the silicon source and the magnesium source.

In some embodiments, under the condition that the first mineralizer includes boric acid and aluminum fluoride, and a mass ratio of the boric acid to the aluminum fluoride in the first mixture is in a range of (0.5-3): (1-5).

In some embodiments, subjecting the first mixture or the second mixture to one-step sintering includes the following steps:

subjecting the first mixture or the second mixture to a first temperature rise from room temperature to a first temperature, and a first heat preservation at the first temperature, to obtain a first pre-sintered material or a second pre-sintered material;

subjecting the first pre-sintered material or the second pre-sintered material to a second temperature rise from the first temperature to a second temperature, and a second heat preservation at the second temperature, to obtain a first intermediate sintered material or a second intermediate sintered material; and subjecting the first intermediate sintered material or the second intermediate sintered material to a third temperature rise from the second temperature to a third temperature, and a third heat preservation at the third second temperature, wherein the first temperature is in a range of 700° C.-850° C., and the first heat preservation is performed for 1 h-3 h; the second temperature is in a range of 900° C.-1000° C., and the second heat preservation is performed for 0.5 h-1.5 h; the third temperature to which a temperature of the first intermediate sintered material rises is in a range of 1700° C.-1800° C.; the third temperature to which a temperature of the second intermediate sintered material rises is in a range of 1250° C.-1400° C.; and the third heat preservation is performed for 3 h-4 h.

In some embodiments, the first temperature rise and the second temperature rise are each performed independently at a rate of 5° C./min-10° C./min, and the third temperature rise is performed at a rate of 1° C./min-5° C./min.

In some embodiments, the method further includes after obtaining the first mixture or the second mixture and before the one-step sintering, subjecting the first mixture or the second mixture to compression molding to obtain a first compact or a second compact, respectively; and subjecting the first compact or the second compact to one-step sintering to obtain a refractory compact.

In some embodiments, the compression molding is performed at a pressure of 10 MPa-35 MPa.

In some embodiments, the aluminum source includes at least one selected from the group consisting of alumina and aluminum hydroxide, and the magnesium source includes at least one selected from the group consisting of seawater magnesia and light-burnt magnesite.

In some embodiments, the silicon source includes one or more selected from the group consisting of quartz, fly ash, talcum, quartz stone, and lithium slag.

In some embodiments, the secondary aluminum dross powder has a particle size of less than or equal to 150 μm;

the first mixing or the second mixing is performed by ball milling.

The present disclosure provides a method for preparing a refractory from a secondary aluminum dross, wherein the secondary aluminum dross contains silica and alumina, and the refractory includes a basic magnesium-aluminum refractory and an acidic magnesium-aluminum-silicon refractory; under the condition that the secondary aluminum dross includes less than 5% by mass of silica, the refractory prepared is the basic magnesium-aluminum refractory, and the method includes the following steps: subjecting a secondary aluminum dross powder, an aluminum source, a magnesium source and a magnesia-alumina spinel seed crystal to first mixing to obtain a first mixture, and subjecting the first mixture to one-step sintering to obtain the basic magnesium-aluminum refractory, wherein the aluminum source is an aluminum-containing compound; and during the first mixing, provided that a mass of the secondary aluminum dross powder is converted to and expressed in terms of a mass of alumina, a mass of the aluminum source is converted to and expressed in terms of a mass of alumina, and a mass of the magnesium source is converted to and expressed in terms of a mass of magnesium oxide, the mass of the aluminum source accounts for 2%-10% of the mass of the secondary aluminum dross powder, the mass of the magnesium source accounts for 20%-30% of the mass of the secondary aluminum dross powder, and a mass of the magnesia-alumina spinel seed crystal accounts for 0.1%-0.5% of the mass of the secondary aluminum dross powder; under the condition that the secondary aluminum dross includes greater than or equal to 5% by mass of silica, the refractory prepared is the acidic magnesium-aluminum-silicon refractory, and the method includes the following steps: subjecting a secondary aluminum dross powder, a silicon source, and a magnesium source to second mixing to obtain a second mixture, and subjecting the second mixture to one-step sintering to obtain the acidic magnesium-aluminum-silicon refractory; wherein the silicon source is a silicon-containing substance excluding the secondary aluminum dross powder; and during the second mixing, provided that a mass of the secondary aluminum dross powder is converted to masses of alumina and silica, a mass of the magnesium source is converted to a mass of magnesium oxide, and a mass of the silicon source is converted to a mass of silica, and a mass ratio of magnesium oxide, alumina and silica in the second mixture obtained from the second mixing is in a range of (14-15): (36-37): (48-50). In the method according to the present disclosure, basic magnesium-aluminum refractories or acidic magnesium-aluminum-silicon refractories may be prepared by one-step sintering after matching the secondary aluminum dross powder with different raw materials according to different silica contents therein. In the method according to the present disclosure, the mass content of silica in the secondary aluminum dross is analyzed, and 5% by mass of silica in the secondary aluminum dross is recognized as the boundary for preparing acidic/basic refractories from the secondary aluminum dross, which effectively reduces the cost of recycling the secondary aluminum dross. By regulating the different silica contents in the secondary aluminum dross powder, matching with different raw materials, and further regulating the preparation ratio among the raw materials, using magnesium-aluminum spinel as the seed crystal and then one-step sintering, the refractory with low porosity and large grain size could be obtained. The method according to the present disclosure adopts one-step sintering, simultaneously realizes harmless disposal and resource utilization of the secondary aluminum dross at low cost, simplifies the treatment steps of the secondary aluminum dross, and realizes energy saving and emission reduction. The prepared refractory has the characteristic of high density, and may be widely used in the field of building refractories.

In some embodiments, in the present disclosure, after obtaining the first mixture or the second mixture, before the one-step sintering, the method further includes: subjecting the first mixture or the second mixture to compression molding to obtain a first compact or a second compact, respectively; and subjecting the first compact or the second compact to one-step sintering to obtain a refractory compact. In some embodiments of the present disclosure, before the one-step sintering, the first mixture or the second mixture is subjected to compression molding, which is conducive to obtaining a dense refractory compact through one-step sintering.

In some embodiments, in the present disclosure, the first mixture further includes a first mineralizer; the first mineralizer includes at least one selected from the group consisting of boric acid and aluminum fluoride, and a mass of the first mineralizer accounts for 1.5%-8% of the mass of the secondary aluminum dross powder, the mass of the secondary aluminum dross powder being converted to and expressed as the mass of alumina; the second mixture further includes a second mineralizer, and the second mineralizer includes boric acid; and a mass of the second mineralizer accounts for less than or equal to 2% of a mass of the second mixture. In some embodiments of the present disclosure, a mineralizer is further added to the mixture. The first mineralizer and magnesia-alumina spinel are used together as the crystal seed during the sintering, which is conducive to further improving the grain size, reducing the microscopic defects of the refractory and further improving the density of the refractory.

In some embodiments of the present disclosure, the aluminum source includes at least one selected from the group consisting of alumina and aluminum hydroxide. In the present disclosure, when aluminum hydroxide is used as the aluminum source, it is conducive to obtaining a more compact when the mixture is subjected to compression molding, thereby improving the density of the high-grade refractory prepared by sintering.

BRIEF DESCRIPTION OF THE DRAWINGS

FIG. 2A to FIG. 2D show comparison between the basic magnesium-aluminum refractories prepared in Example 1 and Comparative Example 1 in the present disclosure, in terms of scanning electron microscope (SEM) image, wherein FIG. 2A and FIG. 2C show the SEM graph of the basic magnesium-aluminum refractories prepared in Example 1; and FIG. 2B and FIG. 2D show the SEM graph of the basic magnesium-aluminum refractory prepared in Comparative Example 2.

FIG. 3A to FIG. 3B show comparison between the basic magnesium-aluminum refractories prepared in Comparative Examples 1 to 2 in the present disclosure, in terms of SEM image, wherein FIG. 3A shows the SEM image of the basic magnesium-aluminum refractory prepared in Comparative Example 1; and FIG. 3B shows the SEM image of the basic magnesium-aluminum refractory prepared in Comparative Example 2.

DETAILED DESCRIPTION OF THE EMBODIMENTS

Figure 1:
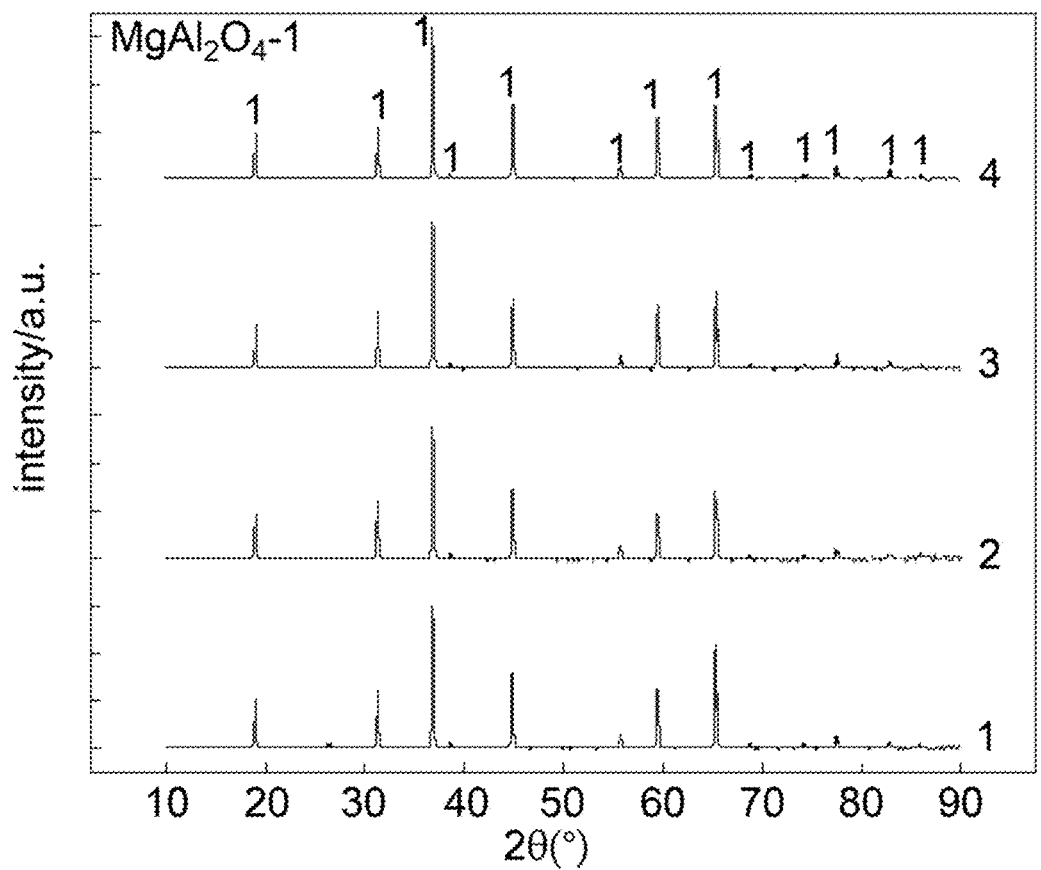
FIG. 1 shows comparisons among the basic magnesium-aluminum refractories prepared in Examples 1 and 4, and Comparative Examples 1 to 2 in the present disclosure, in terms of X-ray diffraction (XRD) pattern.

The present disclosure provides a method for preparing a refractory from a secondary aluminum dross, wherein the secondary aluminum dross contains silica and alumina, and the refractory includes a basic magnesium-aluminum refractory and an acidic magnesium-aluminum-silicon refractory;
  under the condition that the secondary aluminum dross includes less than 5% by mass of silica, the refractory prepared is the basic magnesium-aluminum refractory, and the method includes the following steps:
  subjecting a secondary aluminum dross powder, an aluminum source, a magnesium source and a magnesia-alumina spinel seed crystal to first mixing to obtain a first mixture, and
  subjecting the first mixture to one-step sintering to obtain the basic magnesium-aluminum refractory;
  wherein the aluminum source is an aluminum-containing compound; and during the first mixing, provided that a mass of the secondary aluminum dross powder is converted to and expressed in terms of a mass of alumina, a mass of the aluminum source is converted to and expressed in terms of a mass of alumina, and a mass of the magnesium source is converted to and expressed in terms of a mass of magnesium oxide, the mass of the aluminum source accounts for 2%-10% of the mass of the secondary aluminum dross powder, the mass of the magnesium source accounts for 20%-30% of the mass of the secondary aluminum dross powder, and a mass of the magnesia-alumina spinel seed crystal accounts for 0.1%-0.5% of the mass of the secondary aluminum dross powder;
  under the condition that the secondary aluminum dross includes greater than or equal to 5% by mass of silica, the refractory prepared is the acidic magnesium-aluminum-silicon refractory, and the method includes the following steps:
subjecting a secondary aluminum dross powder, a silicon source, and a magnesium source to second mixing to obtain a second mixture, and
subjecting the second mixture to one-step sintering to obtain the acidic magnesium-aluminum-silicon refractory;
wherein the silicon source is a silicon-containing substance excluding the secondary aluminum dross powder; and during the second mixing, provided that a mass of the secondary aluminum dross powder is converted to masses of alumina and silica, a mass of the magnesium source is converted to a mass of magnesium oxide, and a mass of the silicon source is converted to a mass of silica, a mass ratio of magnesium oxide, alumina and silica in the second mixture obtained from the second mixing is in a range of (14-15): (36-37): (48-50).

In the present disclosure, unless otherwise specified, all preparation raw materials/components are commercially available products well known to those skilled in the art.

In some embodiments of the present disclosure, the secondary aluminum dross further contains a magnesia-alumina spinel.

In the present disclosure, under the condition that the secondary aluminum dross includes less than 5% by mass of silica, the refractory prepared is the basic magnesium-aluminum refractory, and the method includes the following steps:
subjecting a secondary aluminum dross powder, an aluminum source, a magnesium source and a magnesia-alumina spinel seed crystal to first mixing to obtain a first mixture, and
subjecting the first mixture to one-step sintering to obtain the basic magnesium-aluminum refractory;
wherein during the first mixing, provided that a mass of the secondary aluminum dross powder is converted to a mass of alumina, a mass of the aluminum source is converted to a mass of alumina, and a mass of the magnesium source is converted to a mass of magnesium oxide, a mass of the aluminum source accounts for 2%-10% of the mass of the secondary aluminum dross powder, a mass of the magnesium source accounts for 20%-30% of the mass of the secondary aluminum dross powder, and a mass of the magnesia-alumina spinel seed crystal accounts for 0.1%-0.5% of the mass of the secondary aluminum dross powder.

In the present disclosure, a secondary aluminum dross powder, an aluminum source, a magnesium source and a magnesia-alumina spinel are subjected to first mixing to obtain a first mixture; the aluminum source accounts for 2%-10% of the mass of the secondary aluminum dross powder, both in terms of alumina; the magnesium source accounts for 20%-30% of the mass of the secondary aluminum dross powder, the mass of the magnesium source being expressed in terms of magnesium oxide; and the magnesia-alumina spinel accounts for 0.1%-0.5% of the mass of the secondary aluminum dross powder.

In some embodiments of the present disclosure, the secondary aluminum dross powder has a particle size of less than or equal to 150 m, and preferably less than or equal to 75 m.

In some embodiments of the present disclosure, the secondary aluminum dross powder is prepared by grinding the secondary aluminum dross. There is no special limitation on the specific implementation process of the grinding.

As a specific embodiment of the present disclosure, the specific composition of the secondary aluminum dross powder are shown in Table 1:

TABLE 1

| The specific composition of the secondary aluminum dross powder | | | | | | | | |
|---|---|---|---|---|---|---|---|---|
| Composition | $Al_2O_3$ | $SiO_2$ | MgO | $Na_2O$ | CaO | $Fe_2O_3$ | $TiO_2$ | Cl | Others |
| Content (wt %) | 53.14 | 3.87 | 3.60 | 2.23 | 0.864 | 0.313 | 0.454 | 7.28 | 28.562 |

In some embodiments of the present disclosure, the aluminum source includes at least one selected from the group consisting of alumina and aluminum hydroxide, and preferably aluminum hydroxide.

In some embodiments of the present disclosure, the magnesium source includes at least one selected from the group consisting of seawater magnesia and light-burnt magnesite, and preferably light-burnt magnesite. There is no special limitation on the sources of the seawater magnesia and light-burnt magnesite, and the commercially available products well known to those skilled in the art may be used.

In the present disclosure, provided that the mass of the secondary aluminum dross powder is converted to and expressed in terms of a mass of alumina, and the mass of the aluminum source is converted to and expressed in terms of a mass of alumina, the mass of the aluminum source accounts for 2%-10% of the mass of the secondary aluminum dross powder, preferably 2.5%-9%, and more preferably 3%-8%.

In the present disclosure, provided that the mass of the secondary aluminum dross powder is converted to and expressed in terms of a mass of alumina, and the mass of the magnesium source is converted to and expressed in terms of a mass of magnesium oxide, the mass of the magnesium source accounts for 20%-30% of the mass of the secondary aluminum dross powder, preferably 22%-27%, and more preferably 23%-26.5%.

In the present disclosure, provided that the mass of the secondary aluminum dross powder is converted to and expressed in terms of a mass of alumina, the mass of the magnesia-alumina spinel seed crystal accounts for 0.1%-0.5% of the mass of the secondary aluminum dross powder, preferably 0.2%-0.45%, and more preferably 0.25%-0.4%.

In some embodiments of the present disclosure, the first mixture further includes a first mineralizer; the first mineralizer includes at least one selected from the group consisting of boric acid and aluminum fluoride, and a mass of the first mineralizer accounts for 1.5%-8% of the mass of the secondary aluminum dross powder, preferably 2%-6.5%, and more preferably 2.5%-6%, the mass of the secondary aluminum dross powder being converted to and expressed in terms of the mass of alumina. In the present disclosure, when preparing the basic magnesium-aluminum refractory, the mineralizer and the magnesia-alumina spinel are used as the seed crystal together during the sintering.

In some embodiments of the present disclosure, under the condition that the first mineralizer includes boric acid and aluminum fluoride, a mass ratio of boric acid to aluminum fluoride in the first mixture is in a range of (0.5-3): (1-5), preferably (0.55-2.7): (1.5-4.5), and preferably (0.6-2.5): (2-4).

In the present disclosure, under the condition that the secondary aluminum dross includes greater than or equal to 5% by mass of silica, the refractory prepared is the acidic magnesium-aluminum-silicon refractory, and the method includes the following steps:
  subjecting a secondary aluminum dross powder, a silicon source, and a magnesium source to second mixing to obtain a second mixture, and
  subjecting the second mixture to one-step sintering to obtain the acidic magnesium-aluminum-silicon refractory,
  wherein during the second mixing, provided that a mass of the secondary aluminum dross powder is converted to masses of alumina and silica, a mass of the magnesium source is converted to a mass of magnesium oxide, and a mass of the silicon source is converted to a mass of silica, a mass ratio of magnesium oxide, alumina and silica in the second mixture obtained from the second mixing is in a range of (14-15): (36-37): (48-50).

In some embodiments of the present disclosure, the silicon source includes one or more selected from the group consisting of quartz, fly ash, talcum, quartz stone, and lithium slag.

In some embodiments of the present disclosure, a main chemical composition of the acidic magnesium-aluminum-silicon refractory is $Mg_2Al_4Si_5O_{18}$, that is, a mass ratio of magnesium oxide, alumina and silica is 13.7:35:51.3. Since the secondary alumina dross contains a certain amount of magnesia-alumina spinel with relatively stable chemical properties, in some embodiments of the present disclosure, the mass ratio of magnesium to aluminum in the second mixture is improved when preparing the acidic magnesium-aluminum-silicon refractory. Therefore, in the present disclosure, the mass ratio of magnesium oxide, alumina and silica in the second mixture is in a range of (14-15): (36-37): (48-50).

In some embodiments of the present disclosure, the second mixture further includes a second mineralizer; the second mineralizer includes boric acid; and a mass of the second mineralizer accounts for less than or equal to 2% of a total mass of the secondary aluminum dross powder, silicon source and magnesium source, and preferably less than or equal to 1.5%.

In some embodiments of the present disclosure, the first mixing or the second mixing is performed by ball milling. There is no special limitation on the specific implementation of the ball milling mixing.

In some embodiments of the present disclosure, after obtaining the first mixture or the second mixture and before the one-step sintering, the method further includes:
  subjecting the first mixture or the second mixture to compression molding to obtain a first compact or a second compact; and
  subjecting the first compact or the second compact to one-step sintering to obtain a refractory compact.

In some embodiments of the present disclosure, after the first mixture or the second mixture is obtained, the first mixture or the second mixture is subjected to compression molding to obtain a first compact or a second compact, respectively.

In some embodiments of the present disclosure, the compression molding is performed by dry briquetting.

In some embodiments of the present disclosure, the compression molding is performed at a pressure of 10 MPa-35 MPa, and preferably 15 MPa-30 MPa.

In some embodiments of the present disclosure, the compact is a cylinder having a diameter of 20 mm-30 mm, and preferably 30 mm.

In the present disclosure, after obtaining the mixture or the compact, the mixture or the compact is subjected to one-step sintering to obtain the refractory or the refractory compact.

In some embodiments of the present disclosure, subjecting the first mixture or the second mixture to one-step sintering includes the following steps:
  subjecting the first mixture or the second mixture to a first temperature rise from room temperature to a first temperature, and a first heat preservation at the first temperature, to obtain a first pre-sintered material or a second pre-sintered material;
  subjecting the first pre-sintered material or the second pre-sintered material to a second temperature rise from the first temperature to a second temperature, and a second heat preservation at the second temperature to obtain a first intermediate sintered material or a second intermediate sintered material; and
  subjecting the first intermediate sintered material or the second intermediate sintered material to a third temperature rise from the second temperature to a third temperature, and a third heat preservation at the third temperature;
  wherein the first temperature is in a range of 700° C.-850° C., and preferably 800° C.; the first heat preservation is performed for 1 h-3 h, and preferably 2 h; the second temperature is in a range of 900° C.-1000° C., and preferably 900° C.-950° C.; the second heat preservation is performed for 0.5 h-1.5 h, and preferably 1 h; the third temperature to which a temperature of the first intermediate sintered material rises is in a range of 1700° C.-1800° C.; the third temperature to which a temperature of the second intermediate sintered material rises is in a range of 1250° C.-1400° C.; and the third heat preservation is performed for 3 h-4 h, and preferably 3 h or 4 h.

In some embodiments of the present disclosure, the first temperature rise is performed at a rate of 5° C./min-10° C./min, and preferably 5° C./min or 10° C./min.

In some embodiments of the present disclosure, the second temperature rise is performed at a rate of 5° C./min-10° C./min, and preferably 10° C./min.

In some embodiments of the present disclosure, the third temperature rise is performed at a rate of 1° C./min-5° C./min, and preferably 5° C./min.

In the present disclosure, a third sintered body is obtained after the third heat preservation. In some embodiments of the present disclosure, the third sintered body is cooled to room temperature with a furnace to obtain the refractory.

In the present disclosure, the refractory has a low porosity.

In the present disclosure, crystal particles of the refractory have an average size of greater than or equal to 18.04 m.

In the present disclosure, it can be seen from the XRD results that the main chemical composition of the basic magnesium-aluminum refractory is $MgAl_2O_4$.

In order to further illustrate the present disclosure, the technical solutions provided by the present disclosure will be described in detail below in conjunction with drawings and examples, but they should not be understood as limiting the scope of the present disclosure.

Example 1

A secondary aluminum dross powder (having a particle size of less than or equal to 150 m and specific composition shown in Table 1), alumina, light-burnt magnesite, boric acid, aluminum fluoride and a magnesia-alumina spinel seed crystal were mixed, obtaining a mixture. Provided that the mass of the secondary aluminum dross powder was expressed in terms of alumina in the secondary aluminum dross powder, and the mass of light-burnt magnesite was expressed in terms of magnesium oxide in light-burnt magnesite, a mass of aluminum hydroxide accounted for 5% of the mass of the secondary aluminum dross powder, a mass of light-burnt magnesite accounted for 20% of the mass of the secondary aluminum dross powder, a mass of boric acid accounted for 0.5% of the mass of the secondary aluminum dross powder, a mass of aluminum fluoride accounted for 3% of the mass of the secondary aluminum dross powder, and a mass of the magnesia-alumina spinel seed crystal accounted for 0.1% of the mass of the secondary aluminum dross powder.

The mixture was subjected to dry briquetting, obtaining a cylinder compact. The dry briquetting was performed at a pressure of 35 MPa. The cylinder compact had a diameter of 30 mm.

The cylinder compact was heated from room temperature to 800° C. at a rate of 10° C./min and then subjected to heat preservation at 800° C. for 2 h; then heated from 800° C. to 900° C. at a rate of 10° C./min and then subjected to heat preservation at 900° C. for 1 h; subsequently heated from 900° C. to 1700° C. at a rate of 5° C./min and then subjected to heat preservation at 1700° C. for 4 h, and finally cooled with a furnace to room temperature, obtaining a basic magnesium-aluminum refractory.

The density, volume and composition of the basic magnesium-aluminum refractory prepared in Example 1 were analyzed. The results are shown in Table 2 and Table 3. Table 2 shows the density and volume of the basic magnesium-aluminum refractory prepared in Example 1 after weighing five times, the density and volume being average values.

TABLE 2

The density and volume measurement results of the basic magnesium-aluminum refractory prepared in Example 1

| Measurement times | Volume (cm³) | Volume deviation (cm³) | Density (g/cm³) | Density deviation (g/cm³) | Elapsed time (mm:ss) | Measuring temperature (° C.) |
|---|---|---|---|---|---|---|
| 1 | 0.2048 | −0.0003 | 3.3853 | 0.0041 | 11:47 | 33.20 |
| 2 | 0.2048 | −0.0002 | 3.3849 | 0.0037 | 13:36 | 33.23 |
| 3 | 0.2051 | 0.0000 | 3.3805 | −0.0007 | 15:30 | 33.25 |
| 4 | 0.2053 | 0.0002 | 3.3771 | −0.0041 | 17:16 | 33.26 |
| 5 | 0.2052 | 0.0002 | 3.3781 | −0.0031 | 19:08 | 33.32 |

It can be seen from Table 2 that the average volume of the basic magnesium-aluminum refractory prepared in Example 1 according to the present disclosure is 0.2050 cm³, and the standard deviation of the volume is 0.0002 cm³. The average density is 0.3812 g/cm³, and the standard deviation of the density is 0.0034 g/cm³.

TABLE 3

The composition measurement results of the basic magnesium-aluminum refractory prepared in Example 1

| Composition | Wt % | Est Error |
|---|---|---|
| $Al_2O_3$ | 58.05 | 0.21 |
| MgO | 30.29 | 0.23 |
| $SiO_2$ | 3.21 | 0.05 |
| CaO | 1.38 | 0.04 |
| $TiO_2$ | 1.00 | 0.02 |
| $Fe_2O_3$ | 0.736 | 0.015 |
| BaO | 0.217 | 0.011 |
| $V_2O_5$ | 0.144 | 0.0072 |
| $ZrO_2$ | 0.0926 | 0.0046 |
| $Na_2O$ | 0.0918 | 0.011 |
| $P_2O_5$ | 0.0904 | 0.0045 |
| $Co_3O_4$ | 0.0791 | 0.0040 |
| NiO | 0.0486 | 0.0024 |
| $Cr_2O_3$ | 0.0444 | 0.0022 |
| $K_2O$ | 0.0354 | 0.0019 |
| SrO | 0.0309 | 0.0015 |
| MnO | 0.0255 | 0.0013 |
| $SO_3$ | 0.0169 | 0.0024 |
| CuO | 0.0161 | 0.0009 |
| ZnO | 0.0120 | 0.0008 |
| $Ga_2O_3$ | 0.0080 | 0.0007 |
| $Ag_2O$ | 0.0062 | 0.0019 |
| Cl | 0.0051 | 0.0020 |
| $Nb_2O_5$ | 0.0048 | 0.0011 |
| $TY_2O_3$ | 0.0020 | 0.0009 |

Example 2

A secondary aluminum dross powder (having a particle size of less than or equal to 150 m and specific composition shown in Table 1), aluminium hydroxide, light-burnt magnesite, boric acid, aluminum fluoride and a magnesia-alumina spinel were mixed, obtaining a mixture. Provided that the mass of the secondary aluminum dross powder was expressed in terms of alumina in the secondary aluminum dross powder, the mass of the aluminum hydroxide was expressed in terms of alumina in the aluminum hydroxide, and the mass of light-burnt magnesite was expressed in terms of magnesium oxide in light-burnt magnesite, a mass of aluminum hydroxide accounted for 5% of the mass of the secondary aluminum dross powder, a mass of light-burnt magnesite accounted for 20% of the mass of the secondary aluminum dross powder, a mass of boric acid accounted for 0.5% of the mass of the secondary aluminum dross powder, a mass of aluminum fluoride accounted for 3% of the mass of the secondary aluminum dross powder, and a mass of the magnesia-alumina spinel accounted for 0.1% of a mass of the secondary aluminum dross powder.

The mixture was subjected to dry briquetting, obtaining a cylinder compact. The dry briquetting was performed at a pressure of 35 MPa. The cylinder compact had a diameter of 30 mm.

The cylinder compact was heated from room temperature to 800° C. at a rate of 10° C./min and then subjected to heat preservation at 800° C. for 2 h, then heated from 800° C. to 900° C. at a rate of 10° C./min and then subjected to heat preservation at 900° C. for 1 h, subsequently heated from 900° C. to 1700° C. at a rate of 5° C./min and then subjected to heat preservation at 1700° C. for 4 h, and finally cooled with a furnace to room temperature, obtaining a basic magnesium-aluminum refractory.

Example 3

A secondary aluminum dross powder (having a particle size of less than or equal to 150 m and specific composition shown in Table 1), aluminium hydroxide, light-burnt magnesite, boric acid, aluminum fluoride and a magnesia-alumina spinel were mixed, obtaining a mixture. Provided that the mass of the secondary aluminum dross powder was expressed in terms of alumina in the secondary aluminum dross powder, the mass of the aluminum hydroxide was expressed in terms of alumina in the aluminum hydroxide, and the mass of light-burnt magnesite was expressed in terms of magnesium oxide in light-burnt magnesite, a mass of aluminum hydroxide accounted for 5% of the mass of the secondary aluminum dross powder, a mass of light-burnt magnesite accounted for 30% of the mass of the secondary aluminum dross powder, a mass of boric acid accounted for 0.5% of the mass of the secondary aluminum dross powder, a mass of aluminum fluoride accounted for 3% of the mass of the secondary aluminum dross powder, and a mass of the magnesia-alumina spinel accounted for 0.5% of the mass of the secondary aluminum dross powder.

The mixture was subjected to dry briquetting, obtaining a cylinder compact. The dry briquetting was performed at a pressure of 35 MPa. The cylinder compact had a diameter of 30 mm.

The cylinder compact was heated from room temperature to 800° C. at a rate of 10° C./min and then subjected to heat preservation at 800° C. for 2 h, then heated from 800° C. to 900° C. at a rate of 10° C./min and then subjected to heat preservation at 900° C. for 1 h, subsequently heated from 900° C. to 1700° C. at a rate of 5° C./min and then subjected to heat preservation at 1700° C. for 4 h, and finally cooled with a furnace to room temperature, obtaining a basic magnesium-aluminum refractory.

Example 4

A secondary aluminum dross powder (having a particle size of less than or equal to 150 m and specific composition shown in Table 1), alumina, light-burnt magnesite, boric acid, aluminum fluoride and a magnesia-alumina spinel were mixed, obtaining a mixture. Provided that the mass of the secondary aluminum dross powder was expressed in terms of alumina in the secondary aluminum dross powder, and the mass of light-burnt magnesite was expressed in terms of magnesium oxide in light-burnt magnesite, a mass of alumina accounted for 5% of the mass of the secondary aluminum dross powder, a mass of light-burnt magnesite accounted for 20% of the mass of the secondary aluminum dross powder, a mass of boric acid accounted for 0.5% of the mass of the secondary aluminum dross powder, a mass of aluminum fluoride accounted for 3% of the mass of the secondary aluminum dross powder, and a mass of the magnesia-alumina spinel accounted for 0.1% of the mass of the secondary aluminum dross powder.

The mixture was heated from room temperature to 800° C. at a rate of 10° C./min and then subjected to heat preservation at 800° C. for 2 h, then heated from 800° C. to 900° C. at a rate of 10° C./min and then subjected to heat preservation at 900° C. for 1 h, subsequently heated from 900° C. to 1700° C. at a rate of 5° C./min and then subjected to heat preservation at 1700° C. for 4 h, and finally cooled with a furnace to room temperature, obtaining a basic magnesium-aluminum refractory.

Comparative Example 1

A secondary aluminum dross powder (having a particle size of less than or equal to 150 m and specific composition shown in Table 1), light-burnt magnesite, boric acid, aluminum fluoride and a magnesia-alumina spinel were mixed, obtaining a mixture. Provided that the mass of the secondary aluminum dross powder was expressed in terms of alumina in the secondary aluminum dross powder, and the mass of light-burnt magnesite was expressed in terms of magnesium oxide in light-burnt magnesite, a mass of light-burnt magnesite accounted for 20% of the mass of the secondary aluminum dross powder, a mass of boric acid accounted for 0.5% of the mass of the secondary aluminum dross powder, a mass of aluminum fluoride accounted for 3% of the mass of the secondary aluminum dross powder, and a mass of the magnesia-alumina spinel accounted for 0.1% of the mass of the secondary aluminum dross powder.

The mixture was subjected to dry briquetting, obtaining a cylinder compact. The dry briquetting was performed at a pressure of 35 MPa. The cylinder compact had a diameter of 30 mm.

The cylinder compact was heated from room temperature to 800° C. at a rate of 10° C./min and then subjected to heat preservation at 800° C. for 2 h, then heated from 800° C. to 900° C. at a rate of 10° C./min and then subjected to heat preservation at 900° C. for 1 h, subsequently heated from 900° C. to 1700° C. at a rate of 5° C./min and then subjected to heat preservation at 1700° C. for 4 h, and finally cooled with a furnace to room temperature, obtaining a basic magnesium-aluminum refractory.

Comparative Example 2

A secondary aluminum dross powder (having a particle size of less than or equal to 150 m and specific composition shown in Table 1), light-burnt magnesite, boric acid, aluminum fluoride and a magnesia-alumina spinel were mixed, obtaining a mixture. Provided that the mass of the secondary aluminum dross powder was expressed in terms of alumina in the secondary aluminum dross powder, and the mass of light-burnt magnesite was expressed in terms of magnesium oxide in light-burnt magnesite, a mass of light-burnt magnesite accounted for 20% of the mass of the secondary aluminum dross powder, a mass of boric acid accounted for 0.5% of the mass of the secondary aluminum dross powder, a mass of aluminum fluoride accounted for 3% of the mass of the secondary aluminum dross powder, and a mass of the magnesia-alumina spinel accounted for 0.1% of the mass of the secondary aluminum dross powder.

The mixture was heated from room temperature to 800° C. at a rate of 10° C./min and then subjected to heat preservation at 800° C. for 2 h, then heated from 800° C. to 900° C. at a rate of 10° C./min and then subjected to heat preservation at 900° C. for 1 h, subsequently heated from 900° C. to 1700° C. at a rate of 5° C./min and then subjected to heat preservation at 1700° C. for 4 h, and finally cooled with a furnace to room temperature, obtaining a basic magnesium-aluminum refractory.

Test Example 1

The properties of the basic magnesium-aluminum refractories prepared in Examples 1 and 4 and Comparative Examples 1 and 2 were tested.

FIG. 1 shows comparison among high-grade refractories prepared in Examples 1 and 4 and Comparative Examples 1 and 2 in the present disclosure, in terms of XRD pattern, in which 1 in FIG. 1 represents the refractory prepared in Example 1; 2 in FIG. 1 represents the refractory prepared in Example 4; 3 in FIG. 1 represents the refractory prepared in Comparative Example 1; and 4 in FIG. 1 represents the refractory prepared in Comparative Example 2. It can be seen from FIG. 1 that the refractories prepared in Examples 1 and 4 and Comparative Examples 1 and 2 each have a main crystal structure of $MgAl_2O_4$.

Figure 2A:
Figure 2B:
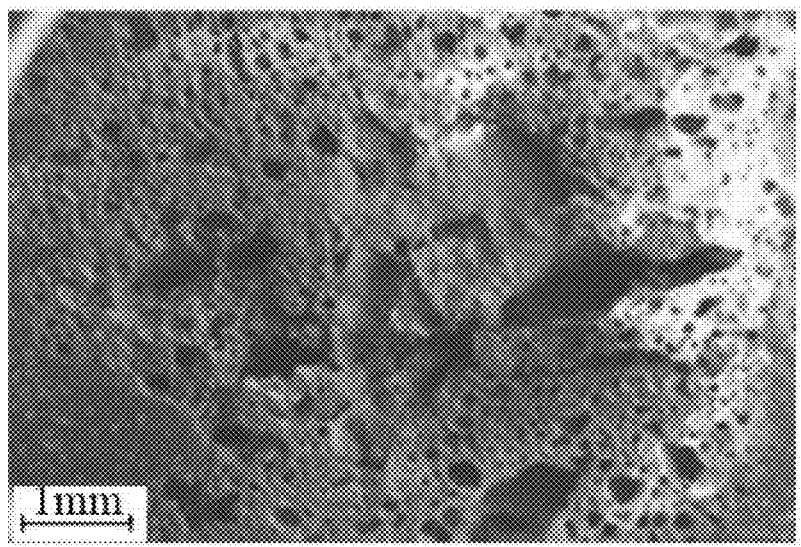
Figure 2C:
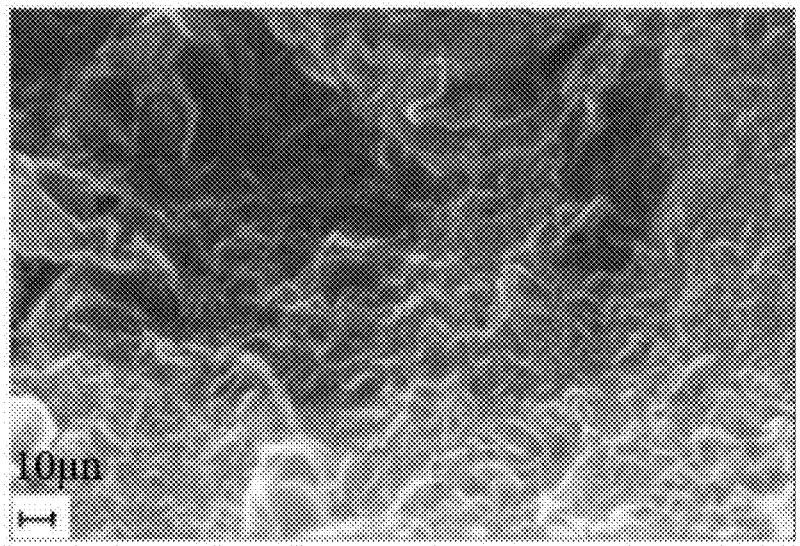
Figure 2D:
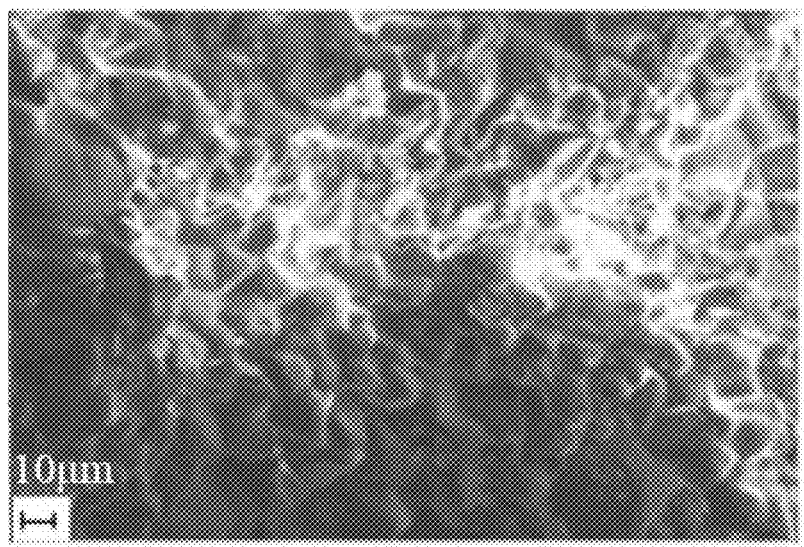

FIG. 2A to FIG. 2D show comparison between the highly-basic magnesium-aluminum refractories prepared in Example 1 and Comparative Example 1 in the present disclosure, in terms of SEM image. FIG. 2A shows a cross-sectional electronic microscope photograph (magnified 20 times) of the basic magnesium-aluminium refractory prepared in Example 1, FIG. 2B shows a cross-sectional electronic microscope photograph (magnified 20 times) of the basic magnesium-aluminium refractory prepared in Comparative Example 1, FIG. 2C shows a cross-sectional electronic microscope photograph (magnified 500 times) of the basic magnesium-aluminium refractory prepared in Example 1, and FIG. 2D shows a cross-sectional electronic microscope photograph (magnified 500 times) of the basic magnesium-aluminium refractory prepared in Comparative Example 1. It can be seen from FIG. 2A to FIG. 2D that the highly-basic magnesia-aluminum refractory prepared by adding alumina in Example 1 has a significantly lower porosity, because alumina has higher activity than alumina in the secondary aluminum dross, which may fill the voids during the sintering reaction and improve product quality.

Figure 3A:
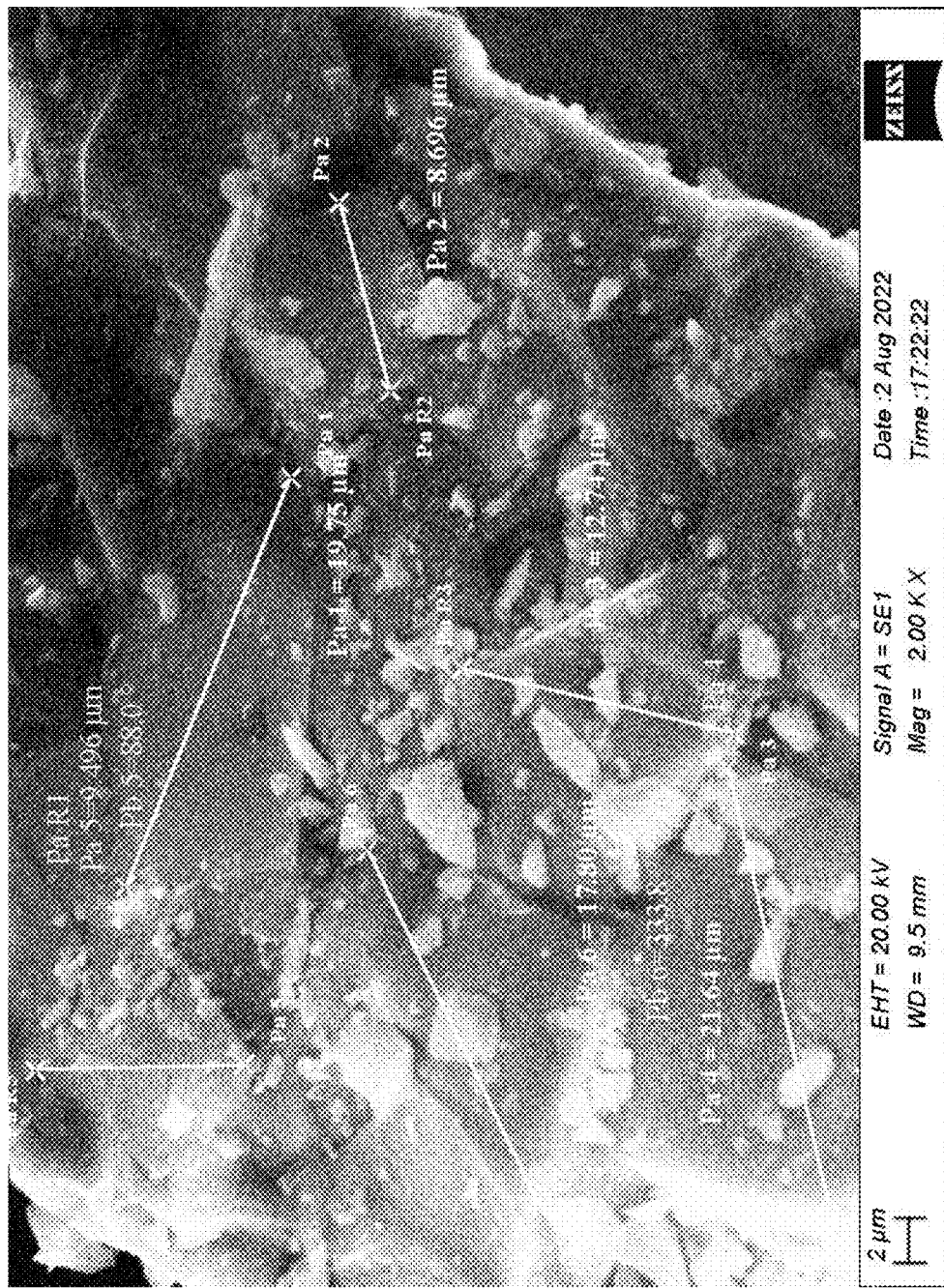
Figure 3B:
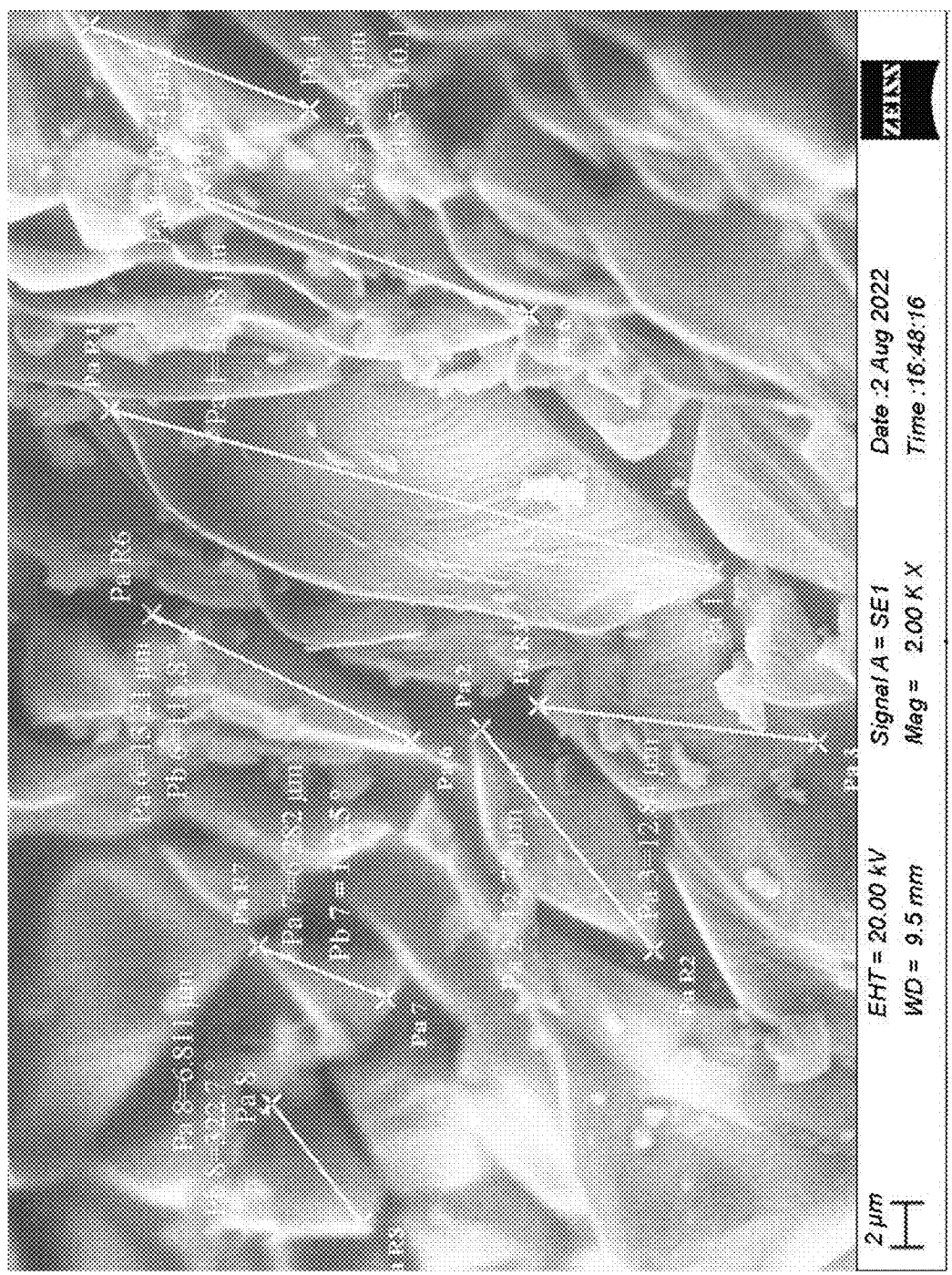
Figure 4:
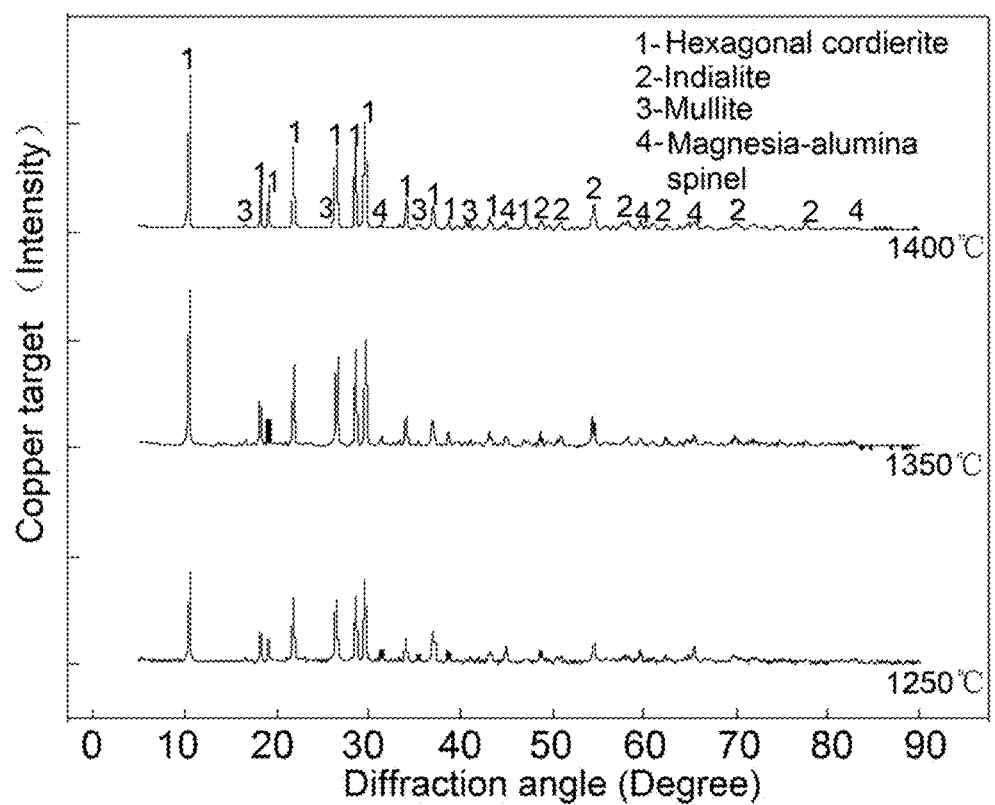
FIG. 4 shows XRD patterns of the acidic magnesium-aluminum-silicon refractories prepared in Examples 5 to 7 according to the present disclosure.
Figure 5:
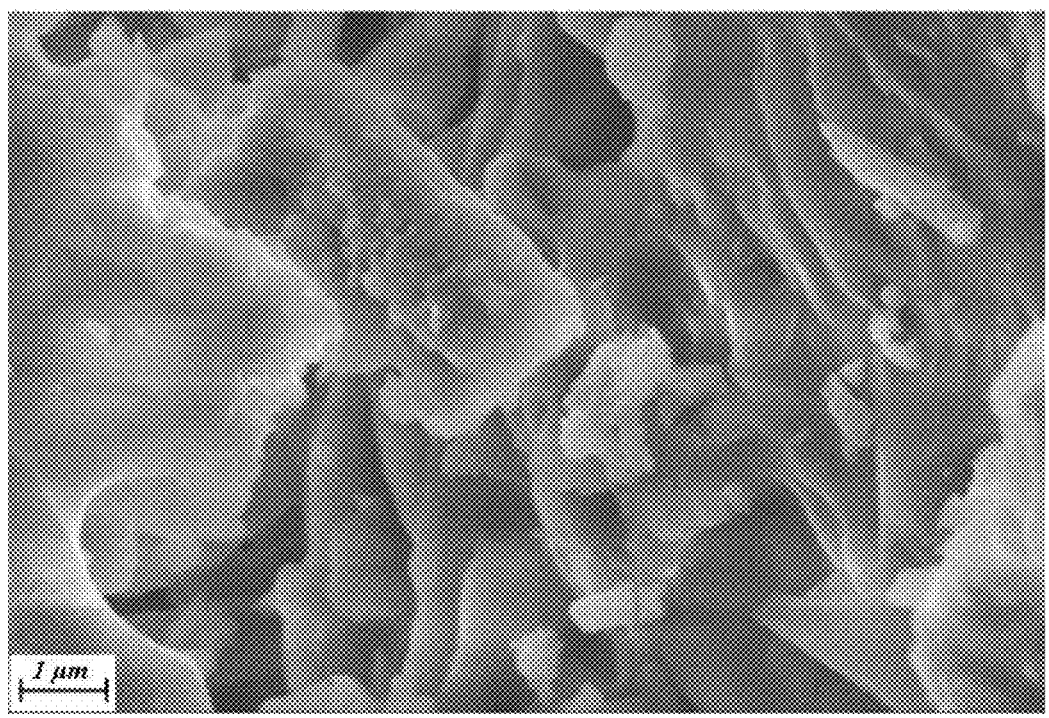
FIG. 5 shows an electron microscope image of the acidic magnesium-aluminum-silicon refractory prepared in Example 5 according to the present disclosure.
Figure 6:
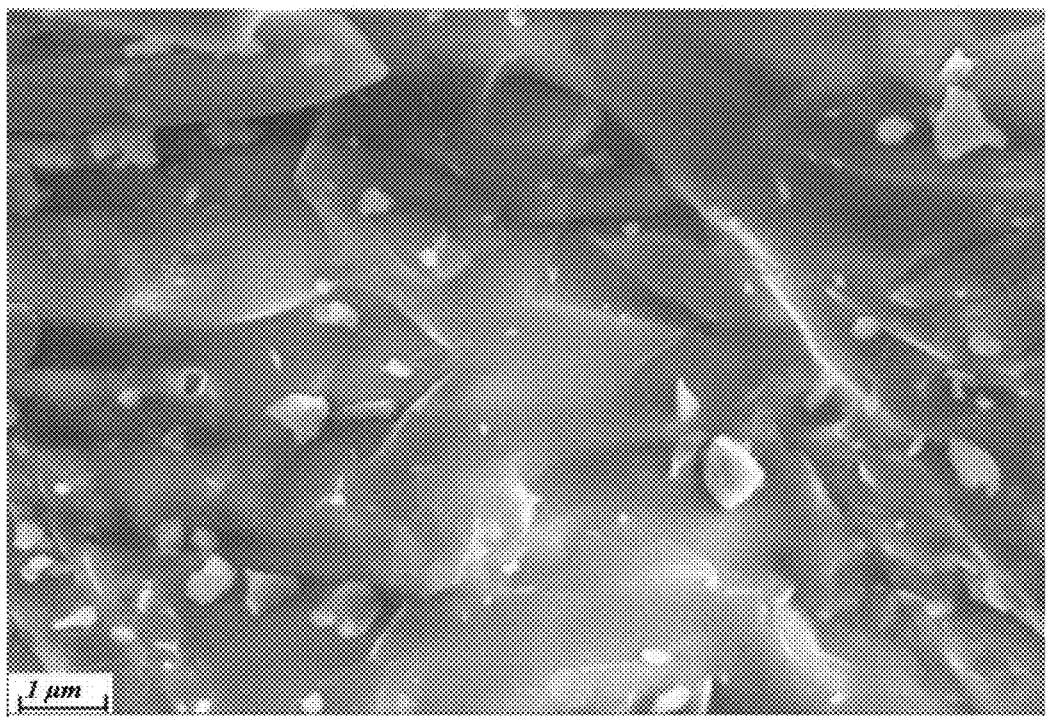
FIG. 6 shows an electron microscope image of the acidic magnesium-aluminum-silicon refractory prepared in Example 6 according to the present disclosure.
Figure 7:
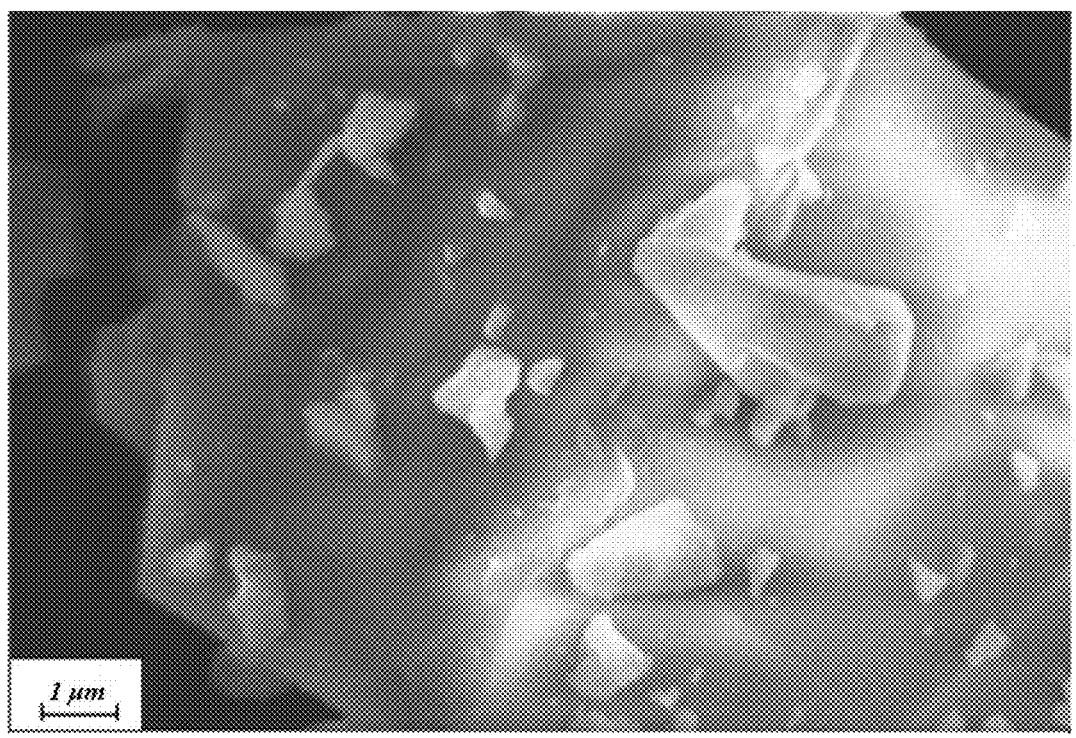
FIG. 7 shows an electron microscope image of the acidic magnesium-aluminum-silicon refractory prepared in Example 7 according to the present disclosure.

FIG. 3A to FIG. 3B show comparison between the highly-basic magnesium-aluminium refractories prepared in Comparative Examples 1 to 2 in the present disclosure, in terms of SEM image. FIG. 3A shows the average grain size of the highly-basic magnesium-aluminium refractory prepared in Comparative Example 1, and the average grain size is 18.04 m. FIG. 3B shows the average grain size of the basic magnesium-aluminium refractory prepared in Comparative Example 2, and the average grain size is 16.47 m. There is a significant increase in the grain size of the samples with the addition of alumina (Comparative Example 1) compared with the samples without the addition of alumina (Comparative Example 2), indicating that the addition of alumina can help improve the quality of the sintered product.

Example 5

A secondary aluminum dross powder (having a particle size of less than or equal to 150 m and specific composition shown in Table 4), talcum powder and light-burnt magnesite were mixed and subjected to grinding mixing, obtaining a mixture. A mass ratio of alumina, magnesium oxide and silica in the mixture was 36:14:50. 0.5% boric acid by mass was added to the mixture and the resulting mixture was subjected to dry briquetting, obtaining a cylinder compact. The dry briquetting was performed at a pressure of 35 MPa. The cylinder compact had a diameter of 30 mm.

The cylinder compact was heated from room temperature to 800° C. at a rate of 10° C./min and then subjected to heat preservation at 800° C. for 0.5 h, then heated from 900° C. to 950° C. at a rate of 5° C./min and then subjected to heat preservation at 950° C. for 0.5 h, subsequently heated from 950° C. to 1250° C. at a rate of 5° C./min and then subjected to heat preservation at 1250° C. for 4 h, and finally cooled with a furnace to room temperature, obtaining an acidic magnesium-aluminum-silicon refractory.

TABLE 4

The compositions of the secondary aluminum dross used in Examples 5-7

| Composition | $Al_2O_3$ | $SiO_2$ | MgO | $Na_2O$ | CaO | F | Cl | Other |
|---|---|---|---|---|---|---|---|---|
| Content (wt %) | 62.73 | 6.11 | 1.88 | 2.99 | 3.36 | 2.59 | 3.63 | 16.71 |

TABLE 5

The measured composition results of the acidic magnesium-aluminum-silicon refractory prepared in Example 5

| Composition | Wt % | Est Error |
|---|---|---|
| $Al_2O_3$ | 33.25 | 0.20 |
| MgO | 12.50 | 0.17 |
| $SiO_2$ | 50.50 | 0.11 |
| CaO | 0.952 | 0.019 |
| $TiO_2$ | 0.487 | 0.00071 |
| $Fe_2O_3$ | 0.441 | 0.009 |

Example 6

A secondary aluminum dross powder (having a particle size of less than or equal to 150 μm and specific composition shown in Table 4), talcum powder and light-burnt magnesite were mixed and subjected to grinding mixing, obtaining a mixture. A mass ratio of alumina, magnesium oxide and silica in the mixture was 36:14:50. 0.5% boric acid by mass was added to the mixture and the resulting mixture was subjected to dry briquetting, obtaining a cylinder compact. The dry briquetting was performed at a pressure of 35 MPa. The cylinder compact had a diameter of 30 mm. The cylinder compact was heated from room temperature to 800° C. at a rate of 10° C./min and then subjected to heat preservation at 800° C. for 0.5 h, then heated from 900° C. to 950° C. at a rate of 5° C./min and then subjected to heat preservation at 950° C. for 0.5 h, subsequently heated from 950° C. to 1350° C. at a rate of 5° C./min and then subjected to heat preservation at 1350° C. for 4 h, and finally cooled with a furnace to room temperature, obtaining an acidic magnesium-aluminum-silicon refractory.

Example 7

A secondary aluminum dross powder (having a particle size of less than or equal to 150 m and specific composition shown in Table 4), talcum powder and light-burnt magnesite were mixed and subjected to grinding mixing, obtaining a mixture. A mass ratio of alumina, magnesium oxide and silica in the mixture was 36:14:50. 0.5% boric acid by mass was added to the mixture and the resulting mixture was subjected to dry briquetting, obtaining a cylinder compact. The dry briquetting was performed at a pressure of 35 MPa. The cylinder compact had a diameter of 30 mm.

The cylinder compact was heated from room temperature to 800° C. at a rate of 10° C./min and then subjected to heat preservation at 800° C. for 0.5 h; then heated from 800° C. to 950° C. at a rate of 5° C./min and then subjected to heat preservation at 950° C. for 0.5 h; subsequently heated from 950° C. to 1400° C. at a rate of 5° C./min and then subjected to heat preservation at 1400° C. for 4 h, and finally cooled with a furnace to room temperature, obtaining an acidic magnesium-aluminum-silicon refractory.

Test Example 2

The products prepared in Examples 5-7 at different temperatures were analyzed and tested. The magnesium-aluminum-silicon refractories with combined cordierite and mullite can be obtained by sintering at 1250° C.-1400° C. The indialite is tetragonal cordierite, which is also a structure of cordierite. With the increase of sintering temperature, tetragonal cordierite transforms into a more stable hexagonal cordierite. An obvious glass phase can be formed at a temperature of 1350° C.-1400° C. When the sintering temperature exceeds 1400° C., the cordierite could be gradually decomposed into mullite, resulting in an increase of mullite content in the system. Therefore, when preparing such magnesium-aluminum-silicon refractory, the specific use of the product should be considered to particularly design the final sintering temperature.

Although the present disclosure has been described in detail by the above examples, but those examples are only a part, not all of the present disclosure. It should understand that other examples can be obtained without creativity according to these examples, all of which are within the scope of the present disclosure.

What is claimed is:

1. A method for preparing a refractory from a secondary aluminum dross, wherein the secondary aluminum dross contains silica and alumina, and the refractory comprises a basic magnesium-aluminum refractory or an acidic magnesium-aluminum-silicon refractory;

under the condition that the secondary aluminum dross comprises less than 5% by mass of silica, the refractory prepared is the basic magnesium-aluminum refractory, and the method comprises the steps of:

subjecting a secondary aluminum dross powder, an aluminum source, a magnesium source and a magnesia-alumina spinel seed crystal to first mixing to obtain a first mixture, and subjecting the first mixture to one-step sintering to obtain the basic magnesium-aluminum refractory, wherein the aluminum source is an aluminum-containing compound; and during the first mixing, provided that a mass of the secondary aluminum dross powder is converted to and expressed in terms of a mass of alumina, a mass of the aluminum source is converted to and expressed in terms of a mass of alumina, and a mass of the magnesium source is converted to and expressed in terms of a mass of magnesium oxide, the mass of the aluminum source accounts for 2%-10% of the mass of the secondary aluminum dross powder; the mass of the magnesium source accounts for 20%-30% of the mass of the secondary aluminum dross powder; and a mass of the magnesia-alumina spinel seed crystal accounts for 0.1%-0.5% of the mass of the secondary aluminum dross powder;

under the condition that the secondary aluminum dross comprises greater than or equal to 5% by mass of silica, the refractory prepared is the acidic magnesium-aluminum-silicon refractory, and the method comprises the steps of:

subjecting a secondary aluminum dross powder, a silicon source, and a magnesium source to second mixing to obtain a second mixture, and subjecting the second mixture to one-step sintering to obtain the acidic magnesium-aluminum-silicon refractory, wherein the silicon source is a silicon-containing substance excluding the secondary aluminum dross powder; and during the second mixing, provided that a mass of the secondary aluminum dross powder is converted to masses of alumina and silica, a mass of the magnesium source is converted to a mass of magnesium oxide, and a mass of the silicon source is converted to a mass of silica, a mass ratio of magnesium oxide, alumina and silica in the second mixture obtained from the second mixing is in a range of (14-15): (36-37): (48-50);

wherein subjecting the first mixture or the second mixture to the one-step sintering comprises the following steps:

subjecting the first mixture or the second mixture to a first temperature rise from room temperature to a first temperature, and a first heat preservation at the first temperature to obtain a first pre-sintered material or a second pre-sintered material;

subjecting the first pre-sintered material or the second pre-sintered material to a second temperature rise from the first temperature to a second temperature, and a second heat preservation at the second temperature, to obtain a first intermediate sintered material or a second intermediate sintered material; and subjecting the first intermediate sintered material or the second intermediate sintered material to a third temperature rise from the second temperature to a third temperature, and a third heat preservation at the third temperature, wherein the first temperature is in a range of 700° C.-850° C., and the first heat preservation is performed for 1 h-3 h;

the second temperature is in a range of 900° C.-1000° C., and the second heat preservation is performed for 0.5 h-1.5 h;

the third temperature to which a temperature of the first intermediate sintered material rises is in a range of 1700° C.-1800° C.; the third temperature to which a temperature of the second intermediate sintered material rises is in a range of 1250° C.-1400° C.; and the third heat preservation is performed for 3 h-4 h.

2. The method of claim 1, wherein the first mixture further comprises a first mineralizer, the first mineralizer comprises at least one selected from the group consisting of boric acid and aluminum fluoride, and provided that the mass of the secondary aluminum dross powder is converted to and expressed in terms of the mass of alumina, a mass of the first mineralizer accounts for 1.5%-8% of the mass of the secondary aluminum dross powder; and the second mixture further comprises a second mineralizer, the second mineralizer comprises boric acid, and a mass of the second mineralizer accounts for less than or equal to 2% of a total mass of the secondary aluminum dross powder, the silicon source and the magnesium source.

3. The method of claim 2, wherein under the condition that the first mineralizer comprises boric acid and aluminum fluoride, and a mass ratio of the boric acid to the aluminum fluoride in the first mixture is in a range of (0.5-3):(1-5).

4. The method of claim 1, wherein the first temperature rise and the second temperature rise are each performed independently at a rate of 5° C./min to 10° C./min, and the third temperature rise is performed at a rate of 1° C./min to 5° C./min.

5. The method of claim 1, further comprising, after obtaining the first mixture or the second mixture and before the one-step sintering, subjecting the first mixture or the second mixture to compression molding to obtain a first compact or a second compact, respectively, and subjecting the first compact or the second compact to the one-step sintering to obtain a refractory compact.

6. The method of claim 5, wherein the compression molding is performed at a pressure of 10 MPa-35 MPa.

7. The method of claim 1, wherein the aluminum source comprises at least one selected from the group consisting of alumina and aluminum hydroxide, and the magnesium source comprises at least one selected from the group consisting of seawater magnesia and light-burnt magnesite.

8. The method of claim 1, wherein the silicon source comprises one or more selected from the group consisting of quartz, fly ash, talcum, quartz stone, and lithium slag.

9. The method of claim 1, wherein the secondary aluminum dross powder has a particle size of less than or equal to 150 μm; and the first mixing or the second mixing is performed by ball milling.

* * * * *